(12) United States Patent  (10) Patent No.: US 8,249,448 B2
Driscoll  (45) Date of Patent: Aug. 21, 2012

(54) SYSTEM AND METHOD OF BLOCKING AN ELECTRICAL SIGNAL TRANSMISSION (75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 568 days.

(21) Appl. No.: 12/500,529

(22) Filed: Jul. 9, 2009

(65) Prior Publication Data

US 2010/0014856 A1    Jan. 21, 2010

Related U.S. Application Data (60) Provisional application No. 61/081,302, filed on Jul. 16, 2008.

(51) Int. Cl.
*H04B 10/08* (2006.01)
*H04B 3/46* (2006.01)
*H04B 17/00* (2006.01)

(52) U.S. Cl. ......................... 398/24; 375/224

(58) Field of Classification Search ........................ None
See application file for complete search history.

(56) References Cited

U.S. PATENT DOCUMENTS

| | | | | |
|---|---|---|---|---|
| 4,646,036 A | * | 2/1987 | Brown | 333/81 R |
| 5,140,200 A | * | 8/1992 | Stanton | 327/308 |
| 5,270,824 A | * | 12/1993 | Dobrovolny | 348/731 |
| 5,565,823 A | * | 10/1996 | Fratti | 333/81 R |
| 5,805,386 A | * | 9/1998 | Faris | 360/264.4 |
| 6,667,669 B2 | * | 12/2003 | Goyette et al. | 333/81 R |
| 6,763,039 B1 | * | 7/2004 | Kroemer et al. | 370/509 |
| 6,919,774 B2 | * | 7/2005 | Ritchey et al. | 333/81 R |
| 7,449,976 B1 | * | 11/2008 | Waslo | 333/81 R |
| 2005/0062491 A1 | * | 3/2005 | Burns et al. | 324/763 |
| 2008/0002742 A1 | * | 1/2008 | Wu | 370/476 |

OTHER PUBLICATIONS

Hewlett Packard, "Applications of Pin Diodes Application Note 922", Nov. 1999, pp. 2-9-2-24.
Doherty et al., "The Pin Diode Circuit Designer's Handbook", 1998, pp. 1-137, Publisher: Microsemi Corporation, Published in: Watertown, MA.
Skyworks Solutions Inc., "Application Note APN1002: Design With Pin Diodes", Jul. 21, 2005, pp. 1-19, Publisher: Skyworks Solutions Inc.

* cited by examiner

*Primary Examiner* — Kenneth N Vanderpuye
*Assistant Examiner* — Abbas H Alagheband
(74) *Attorney, Agent, or Firm* — Fogg & Powers LLC (57) ABSTRACT

A communication device comprises a port via which the communication device is operable to communicate over a communication channel; command hardware operable to output a controlled signal over the communication channel; monitor hardware operable to monitor the controlled signal and output a controlling signal to block propagation of the controlled signal if a fault is identified in the controlled signal; and signal blocking circuitry coupled to a transmission path of the controlled signal and to a transmission path of the controlling signal; wherein, when the controlled signal is to be blocked, the signal blocking circuitry applies the controlling signal to the controlled signal such that a receiver at one end of the transmission path of the controlled signal identifies the controlled signal as a faulty signal; and wherein, when the controlled signal is not being blocked, the controlled signal is unimpeded by the signal blocking circuitry.

20 Claims, 8 Drawing Sheets

SYSTEM AND METHOD OF BLOCKING AN ELECTRICAL SIGNAL TRANSMISSION

CROSS-REFERENCE TO RELATED APPLICATIONS

This application claims priority to U.S. Provisional Patent Application Ser. No. 61/081,302, filed on Jul. 16, 2008 and entitled "SYSTEM AND METHOD OF BLOCKING AN ELECTRICAL SIGNAL TRANSMISSION", which is referred to herein as the '302 application and which is hereby incorporated herein by reference.

BACKGROUND

In some electronic systems, it is desirable to block the transmission of a signal or otherwise prevent the propagation of the signal in some situations, such as when a signal is transmitted with an error or fault. To enable the blocking of a signal in some situations, additional circuitry is typically added. The components used in typical circuitry for blocking a signal transmission add to the cost and weight of the system. In addition, each component in the additional circuitry through which a signal passes can degrade the signal or can themselves be a source of errors.

SUMMARY

In one embodiment, a communication device is provided. The communication device comprises a port via which the communication device is operable to communicate over a communication channel; command hardware operable to output a controlled signal over the communication channel; monitor hardware operable to monitor the controlled signal and output a controlling signal to block propagation of the controlled signal if a fault is identified in the controlled signal; and signal blocking circuitry coupled to a transmission path of the controlled signal and to a transmission path of the controlling signal; wherein, when the controlled signal is to be blocked, the signal blocking circuitry applies the controlling signal to the controlled signal such that a receiver at one end of the transmission path of the controlled signal identifies the controlled signal as a faulty signal; and wherein, when the controlled signal is not being blocked, the controlled signal is unimpeded by the signal blocking circuitry.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Figure 1:
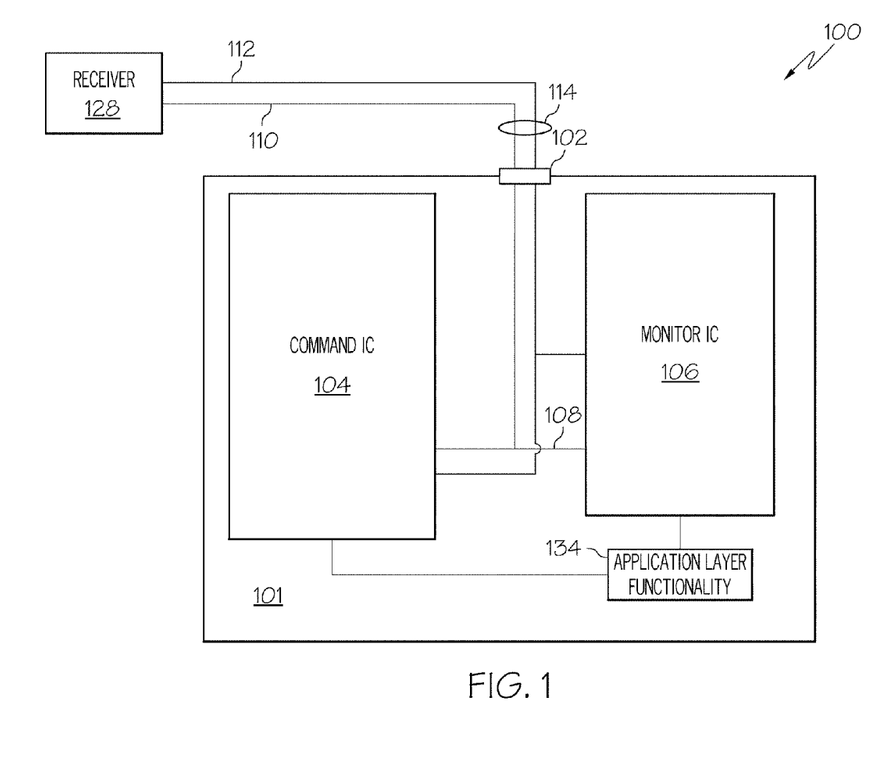
FIG. 1 is a block diagram of one embodiment of a communication system.

FIG. 1 is a block diagram of one embodiment of a communication system 100. Communication system 100 includes a fault-tolerant device 101 configured to block transmission of faulty signals, which transmits signals via one or more communication channels 114 to a receiver 128. As used herein, "blocking" transmission of a signal includes causing the receiver 128 to reject the signal as faulty. It is to be understood that device 101 is provided by way of example and not by way of limitation. For example, other fault-tolerant devices can be used in other embodiments. In addition, receiver 128 can be implemented as a fault-tolerant device having circuitry similar to device 101 with the ability to transmit signals and to block faulty signals.

In the example shown in FIG. 1, device 101 includes a command integrated circuit (IC) 104 and a monitor IC 106. Circuitry in the command IC 104 is also referred to herein as "command hardware" and the circuitry in the monitor IC 106 is also referred to herein as "monitor hardware." Exemplary command hardware and monitor hardware are described in more detail below with respect to FIG. 3. In addition, although the command hardware and monitor hardware are implemented in separate integrated circuits in the example shown in FIG. 1, the command and monitor hardware can be implemented in a single integrated circuit, if requirements permit, in other embodiments. Similarly, in other embodiments, the command hardware and the monitor hardware can be implemented in separate devices, or each can be implemented as circuits comprising several devices.

Each communication channel 114 is implemented using a suitable communication medium or media (for example, metallic communication media such as twisted pair cables, coaxial cable and optical communication media such as fiber optic cables). Both the command IC 104 and the monitor IC 106 are coupled to the transmit portion 110 and one or both can be coupled to the optional receive portion 112 of the respective communication channel 114. The communication channel 114 is coupled to the device 101 via port 102. The command IC 104 transmits signals (also referred to herein as "controlled signals") over transmit portion 110. Since the monitor IC 106 is also coupled to the transmit portion 110, the monitor IC 106 is able to monitor the signals transmitted by the command IC 104 over transmit portion 110. In particular, the monitor IC 106 determines if a signal transmitted by the command IC 104 matches expected values or expected data for a transmission of data (for example, in the form of a packet or message) that is encoded onto the transmitted signal.

Both the monitor IC 106 and the command IC 104 are coupled to application layer functionality 134. Application layer functionality 134 processes data for the desired operation of device 101 and provides the data to monitor IC 106 and the command IC 104 for transmission over communication channel 114. The command IC 104 encodes and transmits the data. The monitor IC 106 performs similar processing on the data from the application layer functionality 134 as the command IC 104 to determine the expected values or data to be transmitted. If the values computed by the monitor IC 106 do not match the values computed by the command IC 104, an error has occurred.

Figure 2:
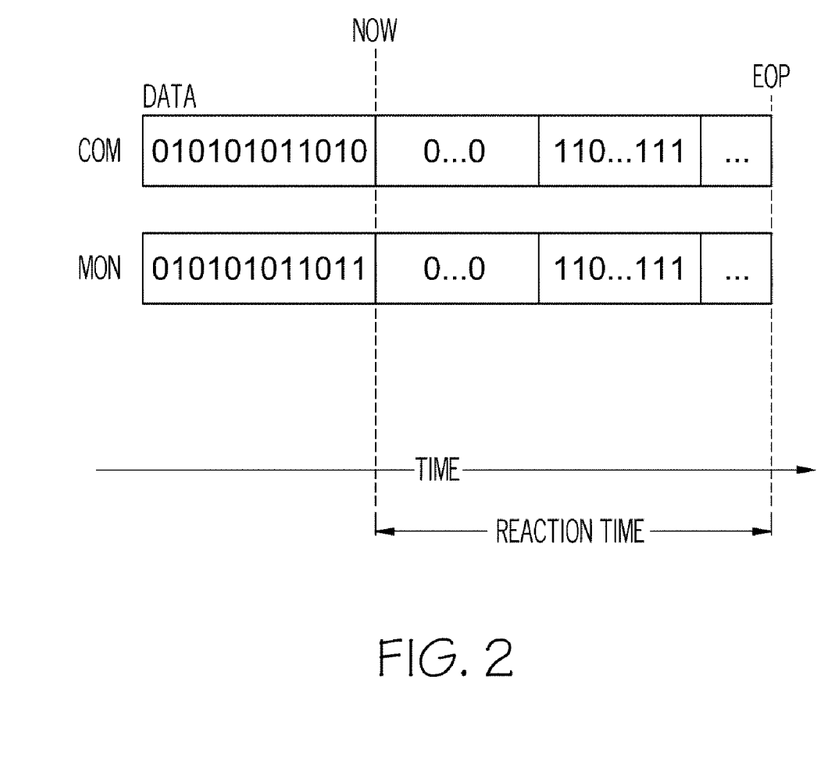
FIG. 2 is a diagram showing one example of the comparison of data associated with a signal to an expected data in order to detect an error in the signal.

For example, in one implementation of such an embodiment, the monitor IC 106 performs a bit-by-bit comparison of the transmitted signal to an expected or computed value for the respective bit. One example of such a bit-by-bit comparison is shown in FIG. 2. In particular, the top line labeled "COM" in FIG. 2 represents the data included in a signal transmitted by the command IC 104 and the second line labeled "MON" represents the data expected by the monitor IC 106. The data is compared bit-by-bit in the monitor IC 106 to determine if the signal is faulty. In some embodiments, the monitor IC 106 compares the entire transmission of the signal to the expected data. In other embodiments, the monitor IC 106 only compares a part of the transmission, such as an identification field or some data field or sub-field that is known to be critical for system operation.

In some fault tolerant systems, the monitor IC 106 needs to block or otherwise notify a receiver 128 that a signal is faulty before the end of the transmission or packet is received by the receiver 128. This is referred to herein as "killing" the transmission or packet. The amount of time in which to kill the transmission is labeled as the reaction time in FIG. 2, where EOP represents the End Of Packet. Notably, although FIG. 2 is described in relation to packet switched networks, other embodiments can be implemented using other network types.

In the example shown in FIG. 2, a mismatch occurs in the twelfth bit. However, a mismatch can occur at any point in the data. Thus, the reaction time can be a relatively short period of time compared to the length of the transmission. In some embodiments, the signals are high speed signals on the order of 1 Gbps or higher. Hence, the monitor IC 106 has to be able to react sufficiently quickly to kill the transmission before the end of the reaction time. In addition, for non-faulty signals, it is desirable for the monitor IC 106 to reduce or minimize any distortions to the transmitted non-faulty signals.

Figure 3:
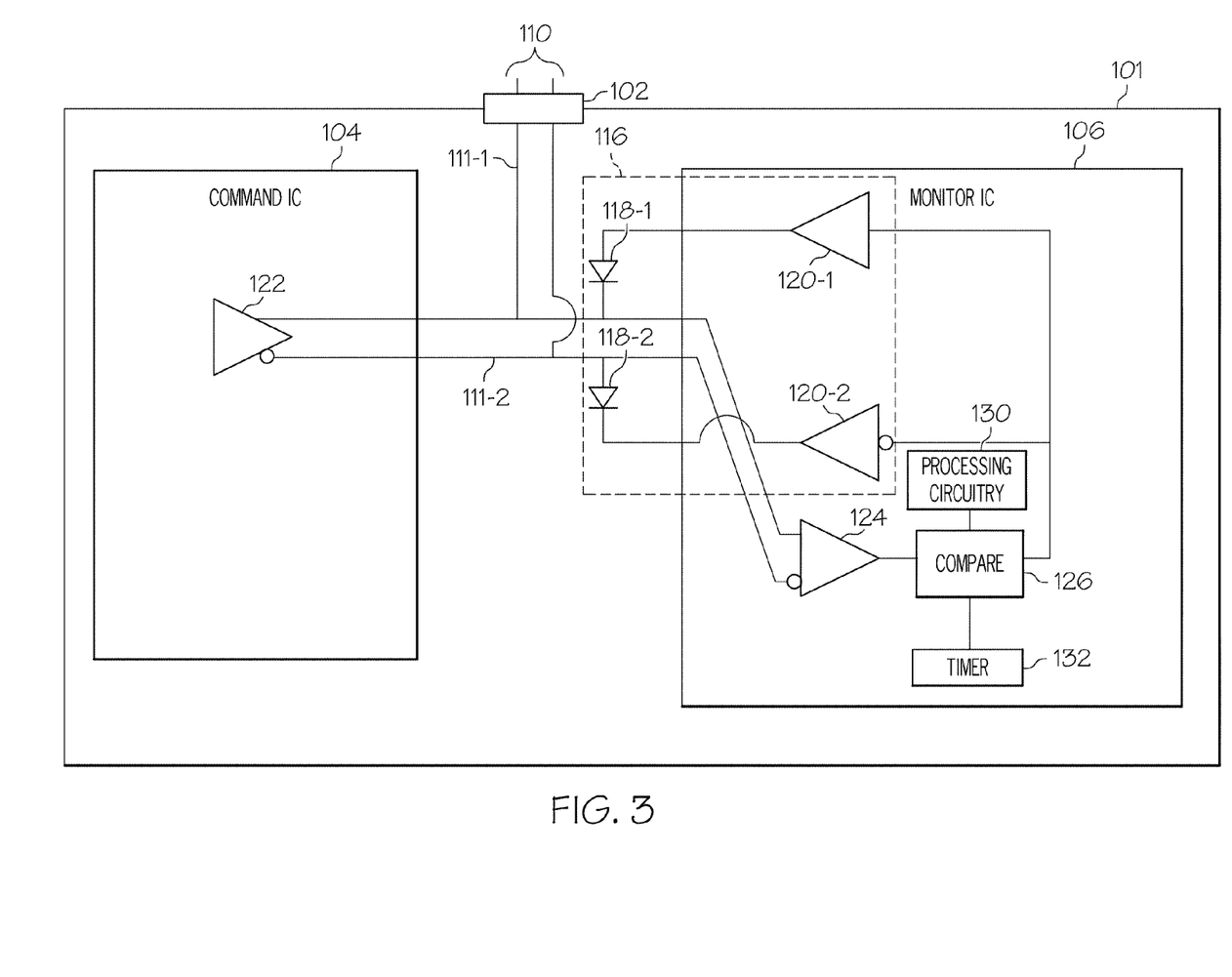
FIG. 3 is a block diagram of one embodiment of a fault-tolerant device used in the system of FIG. 1.

FIG. 3 is a block diagram of one embodiment of the fault-tolerant device 101 shown in FIG. 1. One embodiment of signal blocking circuitry 116 is also shown in FIG. 3 that enables a sufficiently quick response to kill a transmission and minimizes distortion of non-faulty signals. In FIG. 3 the receive portion 112 of communication channel 114 and the Application layer Functionality 134 have been omitted to simplify FIG. 3 for purposes of explanation. In addition, in the embodiment shown in FIG. 3, the transmit portion 110 of the communication channel 114 includes two links 111-1 and 111-2 for differential signaling. However, it is to be understood that a transmit portion 110 having a single communication link 111 for single-ended signaling can be used in other embodiments. In addition, in this embodiment, the transmitted signal is a digital signal transmitted over the communication links 111 using a communication standard from one of the IEEE 802.3 family of standards (commonly referred to as Ethernet).

In the embodiment shown in FIG. 3, signal blocking circuitry 116 includes a diode 118 and a driver 120 for each link 111. In this embodiment, diodes 118 are implemented as PiN diodes. A PiN diode is a diode having an intrinsic "i region" between a p layer and an n layer of a p-n junction. However, other diodes having a low capacitance, such as Schottky diodes, can be used in other embodiments. For example, a low capacitance diode has a capacitance on the order of <1 picofarad in some high speed applications. In the embodiment shown in FIG. 3, one end of each diode 118 is coupled to the respective link 111 and the other end of each diode 118 is coupled to a respective driver 120. Each driver 120 is coupled to a comparison circuit 126 in the monitor IC 106. Notably, in this embodiment, diodes 118 are not included in the monitor IC 106. Placing diodes 118 outside the monitor IC 106 helps reduce distortion of non-faulty signals. In particular, the capacitance of a pin of the IC package is typically larger than the capacitance of the diode 118, which would increase distortion of non-faulty signals. However, it is to be understood that, in other embodiments, the diodes 118 are included in the monitor IC 106 package.

In operation, processing circuitry 130 in the command IC 104 provides a signal to the differential transmitter 122 for transmission over links 111 to the receiver 128. The differential receiver 124 in the monitor IC 106 also receives the differential signal transmitted by the differential transmitter 122 and outputs the signal data to the comparison circuit 126. The comparison circuit 126 also receives the expected data values calculated by the monitor IC 106 in processing circuitry 130. The comparison circuit 126 does a bit-by-bit comparison as described above. Under normal conditions when the data match bit-for-bit, the output of driver 120-1 is low, which reverse biases diode 118-1. Similarly, since driver 120-2 is an inverting driver, the output of driver 120-2 is high under normal conditions, which reverse biases diode 118-2. In the reverse biased state, the signals on links 111 and any direct current (DC) bias from the drivers 120 do not pass through the diodes 118-1 and 118-2.

The capacitance of drivers 120-1 and 120-2 is also small (for example, below 10 nanofarads). Since the drivers 120 and diodes 118 are coupled in series, the total capacitance is equal to the sum of the reciprocal of the individual capacitances. Thus, the total capacitance is smaller than the individual capacitance of either the diodes 118 or drivers 120. Due to the low total capacitance and the fact that non-faulty signals and DC bias do not pass through the diodes 118, little distortion of the non-faulty signals occurs in normal conditions. Thus, the controlled signal is unimpeded by the signal blocking circuitry 116. Furthermore, since only a diode and a driver are used in this embodiment, the number of components which have the potential to corrupt the non-faulty signals is reduced. In addition, the cost and weight of the device 101 is also reduced as compared to typical fault tolerant devices due to the relatively smaller number of simpler components used in signal blocking circuitry 116.

If the comparison circuit 126 detects a mismatch, the comparison circuit 126 outputs a signal that drives the output of driver 120-1 high and the output of driver 120-2 low. In particular, drivers 120-1 and 120-2 are amplifiers that amplify the signal output from the comparison circuit 126 by increasing the current capability of the signal. The signal output by the comparison circuit 126 is also referred to herein as the "kill" signal or "controlling" signal. The amplified kill signal results in switching the bias of diodes 118-1 and 118-2. When the bias of diodes 118-1 and 118-2 switches, the controlled signal transmitted by the differential transmitter 122 is impeded. In particular, the transmitted differential signal passes through the diodes 118-1 and 118-2 or a DC-bias is applied to the differential signal. Hence, the part of the controlled signal on link 111-1 is pulled high by the DC bias and the part of the controlled signal on link 111-2 is pulled low by the applied DC bias in this embodiment. The controlled signal is maintained in this separated state for a sufficient length of time to cause the receiver 128 to view the controlled signal as a faulty signal. Each part of the differential signal looks continuously high or continuously low to the receiver 128 for the duration of the Kill pulse. Thus, an alternating current (AC) signal riding on the DC bias no longer crosses the decision threshold of the receiver 128 which causes the receiver 128 to reject the signal.

Figure 4:
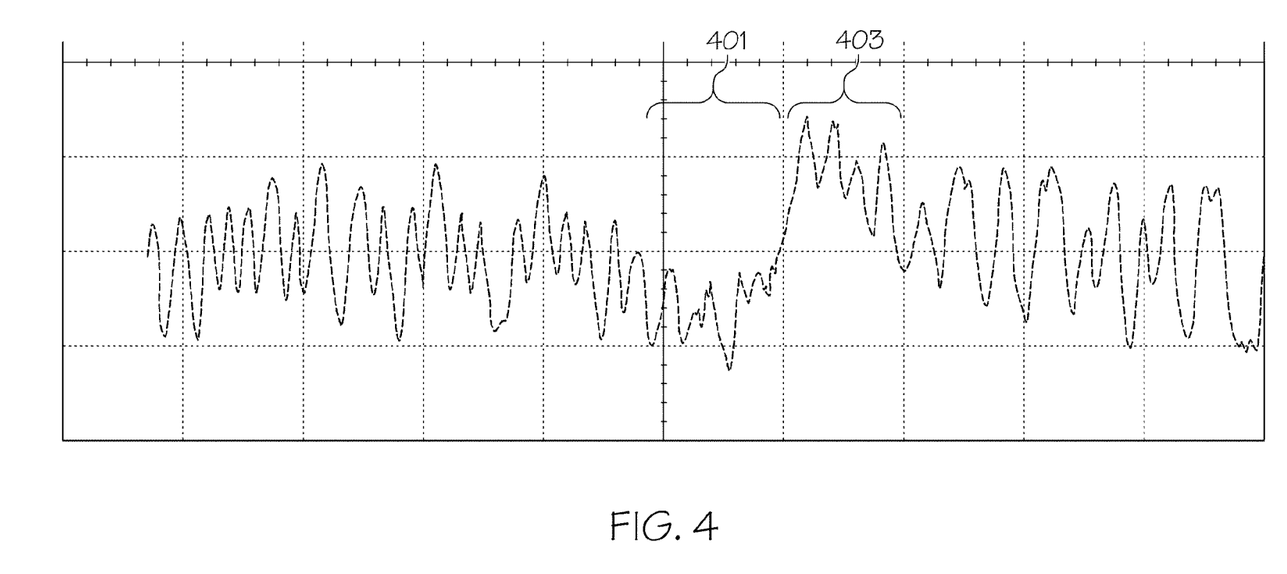
FIG. 4 is an exemplary chart depicting the effect of one embodiment of signal blocking circuitry on a signal transmission.

FIG. 4 is a diagram depicting an exemplary signal trace of a signal output from the signal blocking circuitry 116 of FIG. 3. The separation 401 is the result of switching the bias of diodes 118 to allow the transmitted faulty signal to pass through the diodes or to allow a DC-bias to be applied. In particular, the comparison circuit 126 outputs the kill signal to the drivers 120 for a predetermined amount of time that determines the length of the separation 401. The predetermined amount of time is chosen so that the receiver interprets the signal as being faulty. For example, in this embodiment, 8b/10b encoding is used. In 8b/10b encoding, the longest that a signal can run without changing state is 5 bits. If a signal does not change state for more than 5 bits, the signal is perceived by the receiver 128 as an illegal symbol and is rejected. At speeds around 1.25 Gbps, 5 bits are equal to about 4 nanoseconds. The comparison circuit 126, therefore, outputs the kill signal for more than 4 nanoseconds, which switches the bias of diodes 118 for a sufficient length of time.

For example, in the embodiment shown in FIG. 3, monitor IC 106 includes a timer 132 that is set to count 16 bits. The comparison circuit 126, thus, maintains the diodes 118 in the switched bias state for 16 bits, which results in the separation 401 shown in FIG. 4 of about 12 nanoseconds. The second separation 403 in FIG. 4 is the result of the diodes 118 trying to return to the normal or initial state (that is, the reversed bias state in this example) after the comparison circuit 126 ceases outputting the kill signal. As the diodes 118 return to the normal state, each side of the differential is pulled in the opposite direction and the differential signal is separated for approximately 10 nanoseconds, in this embodiment. Hence, signal blocking circuitry 116 results in two separations, 401 and 403, which each last for approximately twice the amount of time needed to cause the receiver 128 to reject the faulty transmitted signal.

Although 8b/10b encoding is discussed in this embodiment, it is to be understood that other encoding techniques can be used in other embodiments, such as, but not limited to, 4b/5b and Manchester encoding. In addition, although differential signaling is used in this embodiment, single-ended signaling can be used in other embodiments. In such embodiments, only a single diode 118 and driver 120 are used.

For example, in one alternative embodiment, Manchester encoding is used for single-ended signaling. Manchester encoding requires the signal to flip state every other bit. Hence, in such an embodiment, comparison circuit 126 can transmit a kill signal for longer than 2 bits to maintain a diode 118 in the switched bias state. In the switched bias state, a DC-bias is applied or the transmitted signal will pass through diode 118 for longer than 2 bits, which prevents the receiver 128 from seeing the transmitted signal switch state for more than 2 bits. Therefore, the receiver 128 will reject the transmitted signal as a faulty signal.

Figure 5:
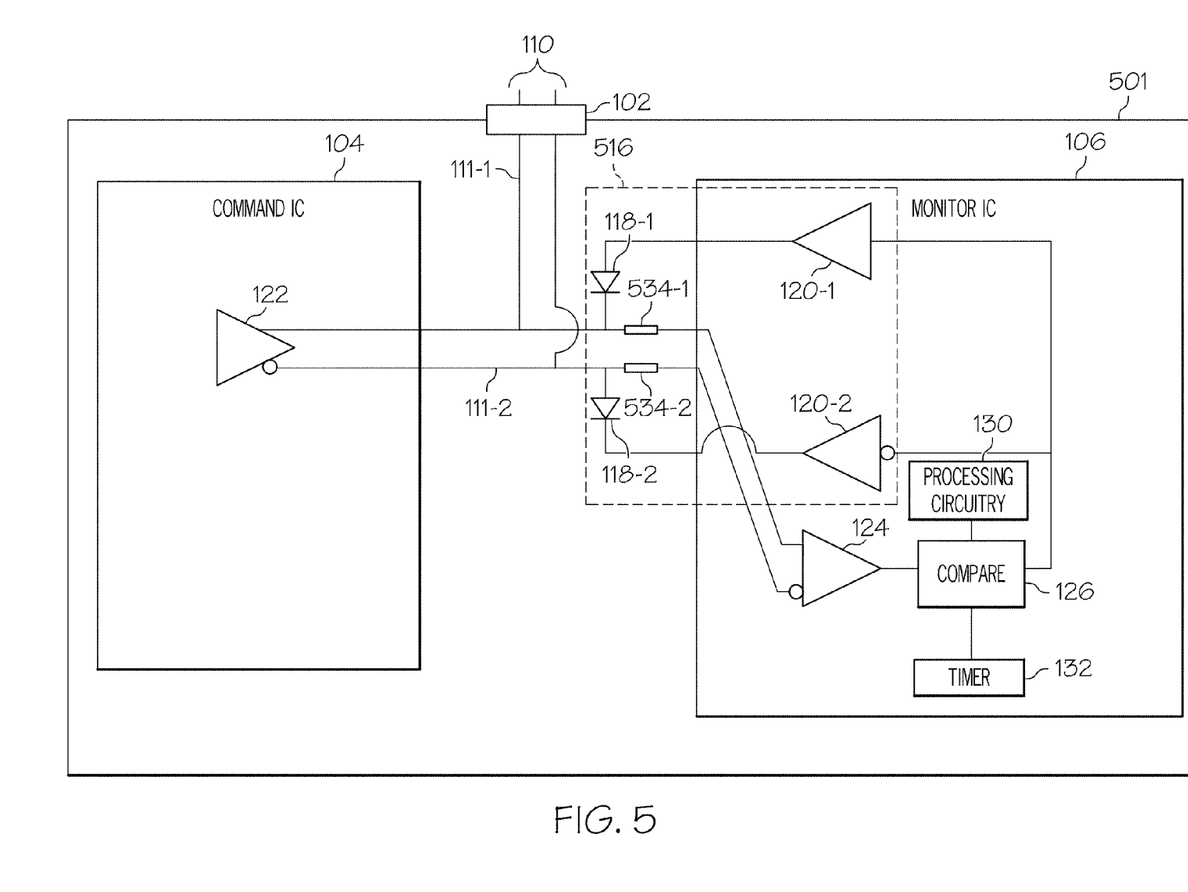
FIG. 5 is a block diagram of another embodiment of a fault-tolerant device.

FIG. 5 is a block diagram of another embodiment of a fault-tolerant device 501 having signal blocking circuitry 516. Fault-tolerant device 501 operates similar to fault-tolerant device 101 described in FIGS. 1 and 2. In the embodiment shown in FIG. 5, signal blocking circuitry 516 includes resistors 534-1 and 534-2. Resistors 534-1 and 534-2 adjust the differential signal to make it as weak locally as it is seen by the receiver 128. In this way, if the transmitter 122 is weak, an error is detected locally by monitor IC 106 whenever a too weak signal is received by the receiver 128. The resisters 534-1 and 534-2 also mitigate any drop in impedance that the capacitance of differential receiver 124 may cause to the signals 111.

Figure 6:
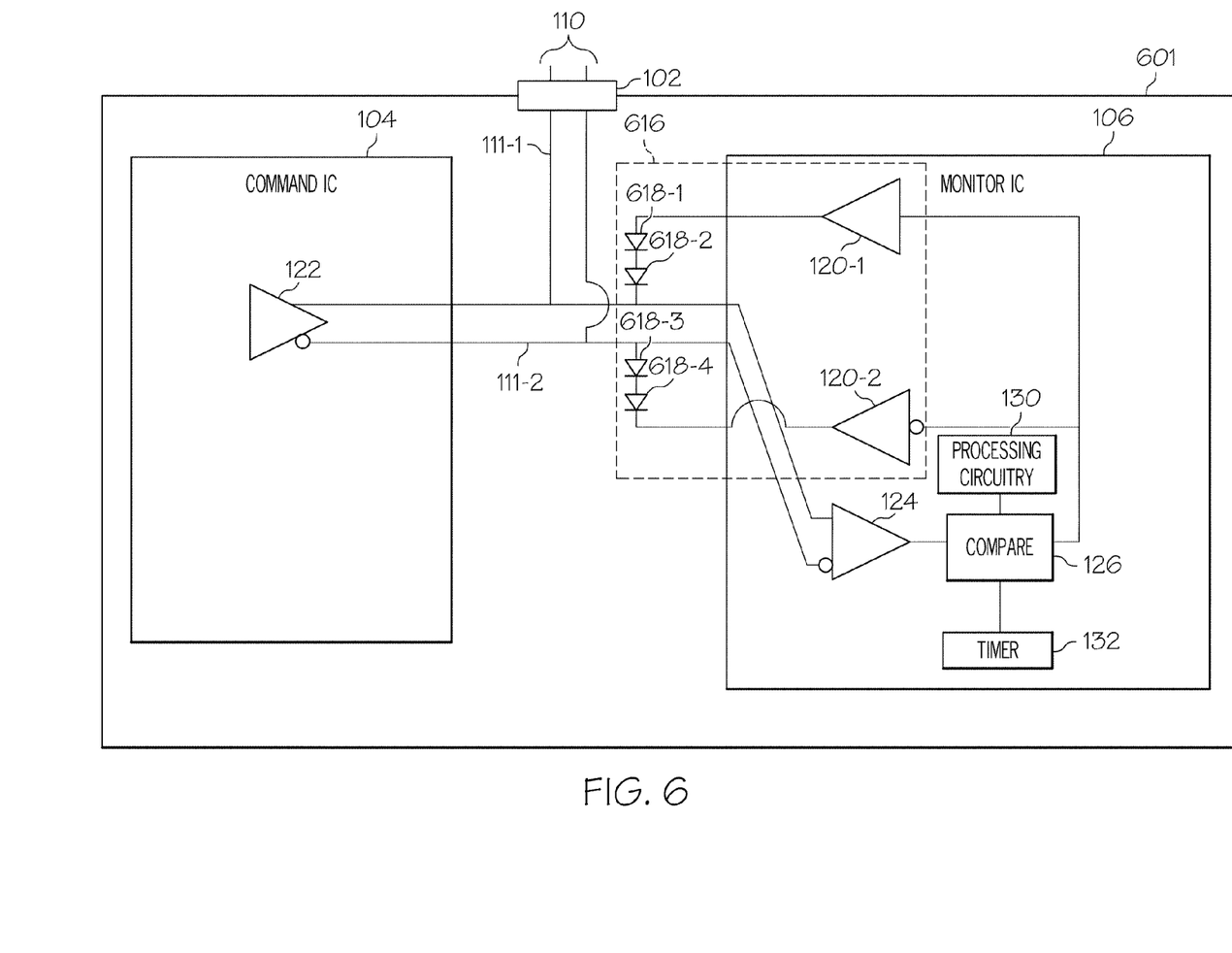
FIG. 6 is a block diagram of yet another embodiment of a fault-tolerant device.

FIG. 6 is a block diagram of another embodiment of a fault-tolerant device 601 having signal blocking circuitry 616. Fault-tolerant device 601 operates similar to fault-tolerant device 101 described in FIGS. 1 and 2. In the embodiment shown in FIG. 6, signal blocking circuitry 616 includes two diodes 618 and a driver 120 for each link 111. FIG. 6 illustrates that more than one diode 618 can be used to reduce the diodes' total capacitance and reduce the distortion of non-faulty signals.

Figure 7:
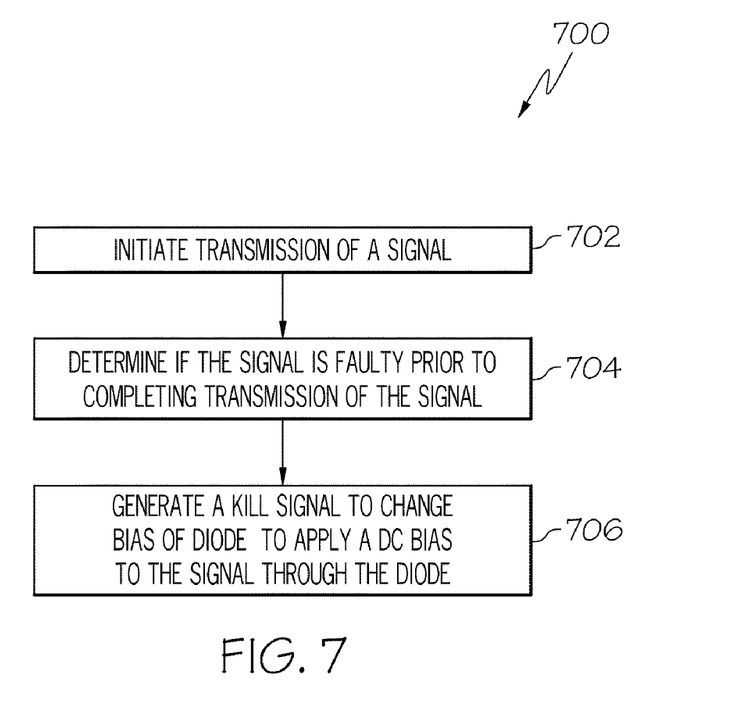
FIG. 7 is a flow chart depicting one embodiment of a method of preventing propagation of a signal.

FIG. 7 is a flow chart depicting one embodiment of a method 700 of preventing propagation of faulty transmissions. Method 700 can be implemented in a communication device such as device 101 described above. At block 702, a transmission is initiated. For example, in some embodiments, a signal is encoded with transmission using a run-length limited (RLL) encoding technique such as 8b/10b, 4b/5b, etc., as described above. In addition, in some embodiments, the transmitted signal is a differential signal. At block 704, it is determined if the transmitted signal contains an error or is otherwise faulty. In particular, an error is detected prior to completing the transmission. For example, in some embodiments, the monitor hardware can monitor the signal and perform a bit-for-bit comparison of the transmitted data with expected values to determine if the transmission contains an error, as described above. If an error is detected, a kill signal is generated at block 706. The kill signal switches the bias of a diode, such as diode 118, from a reverse biased state to a forward biased state. Switching the bias to a forward biased state causes a DC-bias to be applied to the transmitted signal through the diode. Since the DC-bias is applied to at least a portion of the transmitted signal such that no bit transition is seen, the receiver will identify the signal and (the transmission) as faulty and reject it as described above.

Figure 8:
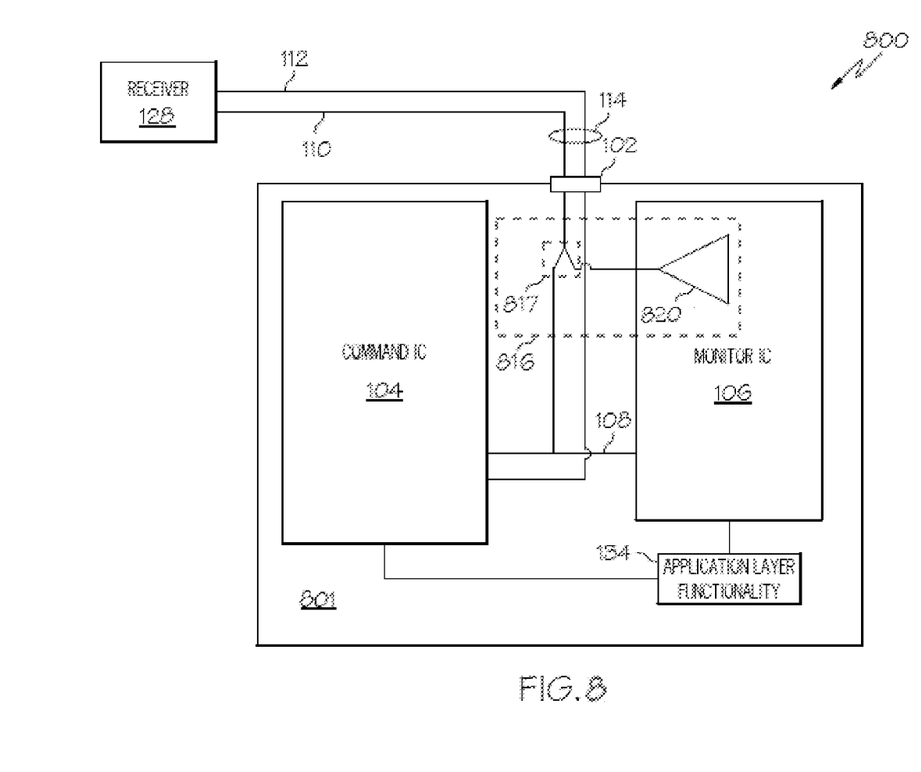
FIG. 8 is block diagram of another embodiment of a fault-tolerant device.

Although specific embodiments have been illustrated and described herein, it will be appreciated by those of ordinary skill in the art that any arrangement, which is calculated to achieve the same purpose, may be substituted for the specific embodiments shown. For example, in the embodiment described above, the signal blocking circuitry 116 is described as including a diode 118 and a driver 120 for each link 111. However, other embodiments of signal blocking circuitry 116 can be used. One exemplary alternative of the signal blocking circuitry 816 is shown in FIG. 8. Signal blocking circuitry 816 is implemented with a directional optical coupler 817, such as a Wye coupler, instead of the diode 118. In such an embodiment, the controlled signal and the controlling signal are optical signals. Thus, electrical driver 120 is replaced with optical driver 820. Outputting the controlling signal to the directional optical coupler 817 has a similar effect as adding the DC bias with the diode 118. In particular, the directional optical coupler 817 adds the controlling signal to the controlled signal such that the receiver 128 is not able to perceive bit transitions in the controlled signal. Thus, the receiver 128 rejects the controlled signal as being faulty. In addition, the directional optical coupler 817 keeps the controlled signal's power from leaking out through the controlling signal's source, like the low capacitance of a reversed bias diode 118. Therefore, it is manifestly intended that this invention be limited only by the claims and the equivalents thereof.

What is claimed is:

1. A communication device comprising:
   a port via which the communication device is operable to communicate with a receiver over a communication channel;
   command hardware coupled to the port and operable to output a controlled signal over the communication channel to the receiver via the port;
   monitor hardware operable to monitor the controlled signal as the controlled signal is being output from the command hardware to the receiver via the port and to output a controlling signal to block propagation of the controlled signal before reception of the controlled signal by the receiver is completed if a fault is identified in the controlled signal; and
   signal blocking circuitry coupled to a transmission path of the controlled signal and to a transmission path of the controlling signal;
   wherein, when the controlled signal is to be blocked, the signal blocking circuitry applies the controlling signal to the controlled signal such that the receiver at one end of the transmission path of the controlled signal identifies the controlled signal as a faulty signal; and
   wherein, when the controlled signal is not being blocked, the controlled signal is unimpeded by the signal blocking circuitry.

2. The communication device of claim 1, wherein the signal blocking circuitry includes at least one diode having one end coupled to the transmission path of the controlled signal and the other end coupled to a transmission path of the controlling signal such that the controlling signal causes the at least one diode to switch from a reverse biased state when the controlled signal is not being blocked to a forward biased state when the controlled signal is to be blocked;
   wherein switching the at least one diode to a forward biased state applies the controlling signal to the controlled signal which adds a direct current (DC) bias to the controlled signal such that the receiver identifies the controlled signal as a faulty signal.

3. The communication device of claim 2, wherein the at least one diode is one of a PiN diode and a Schottky diode.

4. The communication device of claim 1, wherein the controlled signal and the controlling signal are optical signals and the signal blocking circuitry includes a directional optical coupler; wherein, when the controlled signal is to be blocked, the directional optical coupler couples the controlling signal to the controlled signal such that the receiver does not perceive bit transitions and rejects the controlled signal as faulty.

5. The communication device of claim 1, wherein the command hardware is implemented in a first integrated circuit and the monitor hardware is implemented in a second integrated circuit.

6. The communication device of claim 1, wherein the command hardware is operable to encode the controlled signal according to run-length limited (RLL) encoding scheme.

7. The communication device of claim 1, wherein the monitor hardware comprises:
   processing circuitry to calculate expected values for data included in the controlled signal; and
   a comparison circuit to compare data included in the controlled signal with the expected values, wherein the comparison circuit outputs the controlling signal when the data included in the controlled signal does not match the expected values.

8. The communication device of claim 7, wherein the comparison circuit performs a bit-for-bit comparison of the expected values with the data included in the controlled signal.

9. The communication device of claim 1, wherein the command hardware is operable to transmit a differential signal over a pair of communication links;
   wherein, for each of the communication links, the signal blocking circuitry includes at least one diode having one end coupled to the respective communication link and the other end coupled to the transmission path of the controlling signal.

10. The communication device of claim 1, wherein the controlled signal is a digital signal.

11. A signal blocking circuit comprising:
    a driver having an input and an output, wherein the driver is operable to amplify a controlling signal received at the input; and
    a diode coupled between the output of the driver and a signal transmission path such that, when the diode is in an initial bias state, a controlled signal on the signal transmission path is unimpeded;
    wherein the diode is operable to switch from the initial bias state to a blocking bias state in response to the amplified controlling signal output from the driver; and
    wherein, when the diode is in the blocking bias state, a direct current (DC) bias is applied to at least a portion of the controlled signal on the signal transmission path such that a receiver at one end of the signal transmission path identifies the controlled signal on the signal transmission path as a faulty signal.

12. The signal blocking circuit of claim 11, wherein the diode is a PiN diode.

13. The signal blocking circuit of claim 11, wherein the diode is a Schottky diode.

14. The signal blocking circuit of claim 11, wherein the signal transmission path comprises a first communication link and a second communication link for differential signaling, the diode coupled to the first communication link;
    wherein the signal blocking circuit further comprises:
      an inverting driver having an input and an output, the inverting driver operable to amplify and invert a controlling signal received at the input; and
      a second diode coupled between the output of the inverting driver and the second communication link of the signal transmission path such that when the second diode is in an initial state, a part of the controlled signal on the second communication link is unimpeded;
    wherein the second diode is operable to switch from the initial state to a blocking state in response to the amplified controlling signal output from the inverting driver; and
    wherein, when the second diode is in the blocking state, a direct current (DC) bias is applied to at least a part of the controlled signal on the signal on the second communication link such that a receiver at one end of the signal transmission path identifies the controlled signal on the signal transmission path as a faulty signal.

15. A method of preventing propagation of faulty signals, the method comprising:
    initiating transmission of data encoded on a signal over a transmission path to a receiver;
    determining if the encoded signal is to be blocked prior to completion of the transmission; and
    generating a kill signal to switch a diode from a reverse biased state to a forward biased state to apply a direct current (DC) bias to at least a portion of the encoded signal, while the diode is in the forward biased state, such that the receiver rejects the encoded signal as a faulty signal, the diode having one end coupled to the transmission path of the signal and another end coupled to the transmission path of the kill signal;

wherein the encoded signal is unimpeded when the diode is in the reverse biased state.

16. The method of claim 15, wherein initiating transmission of data encoded on the signal comprises encoding the data on to the signal using a run-length limited (RLL) encoding technique.

17. The method of claim 15, wherein initiating transmission of the data encoded on the signal comprises initiating transmission of the data encoded on the signal from a first integrated circuit; and determining if the signal is to be blocked comprises monitoring the signal in a second integrated circuit.

18. The method of claim 17, wherein monitoring the signal comprises performing a bit-for-bit comparison of the data encoded on the signal with expected data.

19. The method of claim 15, wherein initiating transmission of the data encoded on the signal comprises initiating transmission of the data encoded on a differential signal over a pair of communication links; wherein the kill signal switches the bias of a first diode coupled to one of the pair of communication links and the bias of a second diode coupled to the other of the pair of communication links.

20. The method of claim 15, wherein the diode is a PiN diode.

* * * * *